US012780430B2

(12) United States Patent
Geiss et al.

(10) Patent No.: US 12,780,430 B2
(45) Date of Patent: Nov. 3, 2026

(54) HYBRID ELECTRICAL PROPULSION SYSTEM

(71) Applicant: AIRBUS HELICOPTERS DEUTSCHLAND GMBH, Donauwörth (DE)

(72) Inventors: Michael Geiss, Möttingen (DE); Sascha Schneider, Meitingen (DE); Mikolaj Luszczynski, Lodz (PL)

(73) Assignee: AIRBUS HELICOPTERS DEUTSCHLAND GMBH (DE)

( * ) Notice: Subject to any disclaimer, the term of this patent is extended or adjusted under 35 U.S.C. 154(b) by 0 days.

(21) Appl. No.: 19/076,068

(22) Filed: Mar. 11, 2025

(65) Prior Publication Data

US 2026/0015093 A1 Jan. 15, 2026

(30) Foreign Application Priority Data

Jul. 11, 2024 (EP) .................................... 24188058

(51) Int. Cl.
*B64D 27/33* (2024.01)
*B64D 31/18* (2024.01)

(52) U.S. Cl.
CPC ............. *B64D 27/33* (2024.01); *B64D 31/18* (2024.01)

(58) Field of Classification Search
CPC ........ B64D 27/33; B64D 31/18; B64D 27/02; B64D 27/24; B64D 35/022; B64D 35/08
See application file for complete search history.

(56) References Cited

U.S. PATENT DOCUMENTS

| | | | | |
|---|---|---|---|---|
| 11,535,392 | B2 | 12/2022 | Latulipe et al. | |
| 11,667,391 | B2 | 6/2023 | Thomassin et al. | |
| 2010/0219779 | A1 | 9/2010 | Bradbrook | |
| 2014/0010652 | A1 | 1/2014 | Suntharalingam et al. | |
| 2015/0285165 | A1 | 10/2015 | Steinwandel et al. | |
| 2020/0283139 | A1 | 9/2020 | Brand et al. | |
| 2021/0179286 | A1 | 6/2021 | Harvey et al. | |
| 2022/0388673 | A1 | 12/2022 | Thiriet et al. | |
| 2024/0059422 | A1 | 2/2024 | Bertrand et al. | |
| 2024/0270398 | A1 * | 8/2024 | Cevik ........................ | F02C 7/32 |

OTHER PUBLICATIONS

European Search Report for European Application No. EP 24188058.2, Completed by the European Patent Office, Dated Dec. 10, 2024, 9 pages.

* cited by examiner

*Primary Examiner* — Rodney A Bonnette
(74) *Attorney, Agent, or Firm* — Brooks Kushman P.C.

(57) ABSTRACT

A hybrid electrical propulsion system, which comprises a mechanical load; a thermal engine; an electrical machine; a power transmission device comprising a first coupling device connected via a first connecting shaft to the thermal engine and via a second connecting shaft to a second coupling device; and a control system comprising a control logic to provide a setpoint command to the electrical machine. The first coupling device couples the first connecting shaft with the second connecting shaft in a driving manner if a first speed-dependent driving condition is fulfilled. The second coupling device couples a third connecting shaft with a drive shaft in a driving manner if the control logic provides the setpoint command for operating the electrical machine in motor mode and a second speed-dependent driving condition is fulfilled.

19 Claims, 6 Drawing Sheets

HYBRID ELECTRICAL PROPULSION SYSTEM

CROSS-REFERENCE TO RELATED APPLICATION

This application claims priority to European patent application No. EP24188058.2 filed on Jul. 11, 2024, the disclosure of which is incorporated in its entirety by reference herein.

TECHNICAL FIELD

The disclosure is related to a hybrid electrical propulsion system for an aeronautical application. The disclosure is further related to an aircraft comprising such a hybrid electrical propulsion system.

BACKGROUND

Safety is absolutely paramount in air transportation. In fact, air transportation is a field that must typically consider strict applicable regulations, certification requirements, and safety demands independent of a selected air transportation vehicle, such as e.g., helicopters, airplanes, hybrid aircrafts, rockets and so on. Such regulations, certification requirements, and safety demands are e.g., specified by the US-American Federal Aviation Regulations (FAR) from the US-American Federal Aviation Administration (FAA), the European Certification Specifications (CS) from the European Aviation Safety Agency (EASA) and/or other aviation authorities.

Fixed-wing aircrafts and rotary-wing aircrafts address these safety regulations in several different ways. The most common approach for fixed-wing aircrafts involves the use of overpowered jet engines so that the fixed-wing aircraft continues to be operational with the remaining operative jet engines when one jet engine fails. In contrast thereto, most rotary-wing aircrafts rely on the auto-rotation capability that most rotors provide and the use of two or more engines that are connected to a same rotor, whereby the rotor remains operational when one of the engines fails.

However, conventional propulsion units using a single type of engine technology may not be able to simultaneously meet the application requirements in terms of power and reduced energy/fuel consumption. The result may be over-dimensioned energy stores (e.g., fuel reserves) that affect weight and, thus, cannot compensate for power or energy deficiencies. Furthermore, the overall efficiency and fuel consumption of thermal engines are (over) dimensioned to ensure emergency failure situations (e.g., One Engine Inoperative rating), and in normal flight situations (e.g., All Engines Operative rating) they are operated at non-ideal design points. Thus, hybrid propulsion systems, combining steady-state optimized propulsion units (e.g., thermal engines), together with transient power optimized propulsion units (e.g., electric motors), were assessed and seemed to be a promising alternative.

In hybrid electrical aircrafts or distributed propulsion VTOL aircrafts, the requirements on the propulsion system that generates lift and propulsion are extremely challenging. In addition to the requirement to minimize weight while achieving the maximum possible flight range, the need to demonstrate reliability in the event of a failure, e.g., loss of lift/propulsion, requires a high qualification effort on propulsion architecture level. This has driven the design of electrical propulsion systems to be able to undergo failure conditions after an event of propulsion unit failure, e.g., to ensure an emergency landing condition using associated power and energy reserves. Accordingly, implementation of a propulsion unit which is critical for continued safe flight requires additional design efforts, such as integrating a backup system.

U.S. Pat. Nos. 11,535,392, 11,667,391, US 2020/0283139, and US 2014/0010652 each describe a hybrid electrical propulsion system. The hybrid electrical propulsion system includes a heat engine configured to drive a heat engine shaft, an electric motor configured to drive an electric motor shaft, and a transmission system configured to receive rotational input power from each of the heat engine shaft and the electric motor shaft and to convert the rotation input power to output power. However, such a hybrid electrical propulsion system has additional complexity to control the contribution of working point, demands high efforts for control loop design with related complexity, bears a high safety burden e.g., erroneous clutch engagement/-disengagement with related high certification efforts for control logic as well as associated costs, and has drawbacks with the control loop robustness.

The document US2021179286A1 describes a parallel hybrid system, a mechanical connection is provided by the internal combustion engine and at least one propulsor, with at least one electric motor driving either the same propulsor as that driven by the internal combustion engine, or a further propulsor.

The document US2022388673A1 describes a hybrid propulsion system for helicopters, comprising a turboshaft engine and a main electric motor, the main electric motor providing additional torque during certain phases of operation.

The document US2010219779A1 describes a variable drive or hybrid gas turbine engine and, more particularly, to a gas turbine engine in which torque can be selectively transmitted to a primary rotor by an electric motor.

The document US2015285165A1 describes an unmanned aircraft having a propulsion that comprises an internal combustion engine, and having a charger device for engine charging.

The document US2024059422A1 describes an aircraft propulsion system configured to operate a first thermal engine and a second thermal engine, without operating a first electric machine during a first mode of operation to provide aircraft thrust or to operate the first electric machine and the second thermal engine, without operating the first thermal engine, during a second mode of operation to thrust.

SUMMARY

It is, therefore, an object of the present disclosure to provide a hybrid electrical propulsion system for an aeronautical application that is suitable to overcome the above-described drawbacks. The hybrid electrical propulsion system for an aeronautical application should be suitable to optimize propulsion working points during power or energy intensive vehicle operation phases, e.g., take-off/landing and cruise flight.

The object is solved by a hybrid electrical propulsion system for an aeronautical application. More specifically, the hybrid electrical propulsion system for an aeronautical application comprises at least one mechanical load, at least one thermal engine, at least one electrical machine, a power transmission device, and a control system. The at least one electrical machine is operable in motor mode or generator mode. The power transmission device comprises a first coupling device and a second coupling device. The first coupling device is connected via a first connecting shaft to the at least one thermal engine and via a second connecting shaft to the second coupling device. The second coupling device is further connected via a third connecting shaft to the at least one electrical machine and via a drive shaft to the at least one mechanical load. The second connecting shaft is coupled with the drive shaft in a driving manner. The control system comprises a control logic that is configured to provide a setpoint command to the at least one electrical machine. The first coupling device is configured to couple the first connecting shaft with the second connecting shaft in a driving manner if a first speed-dependent driving condition is fulfilled. The second coupling device is configured to couple the third connecting shaft with the drive shaft in a driving manner if the control logic provides the setpoint command to the at least one electrical machine for operating the at least one electrical machine in the motor mode and if a second speed-dependent driving condition is fulfilled.

Advantageously, the inventive hybrid electrical propulsion system for an aeronautical application enables a speed-dependent coupling and enables working point optimization. The contribution from the electrical propulsion towards the mechanical propulsion can be implemented with increased robustness and reliability.

In an illustrative realization, the hybrid electrical propulsion system comprises a mechanical propulsion such as a thermal engine and an electrical propulsion such as an electric motor/generator. The redundant and dissimilar electrical propulsion is provided in order to engage with the mechanical propulsion which improves the availability and reliability of the overall aircraft power plant. As a result, the safety target of total propulsion can be improved. Moreover, if the overall propulsion safety target remains fixed, the safety target for each individual propulsion system, e.g., the mechanical propulsion and the electrical propulsion, can be reduced as both propulsion paths can be combined with the power transmission device to contribute in a failure event, e.g., 'loss of propulsion for mechanical load' and the overall safety target can be shared between both propulsion paths.

More specifically, the mechanical propulsion preferably comprises a gearbox which is driven by a gas turbine, piston engine, etc. The mechanical propulsion preferably drives a first connecting shaft which is rotating at a first rotational speed. The first connecting shaft drives a first coupling device, which may comprise a freewheel or clutch as part of a power transmission device. As such, if a first speed-dependent driving condition is fulfilled, the first coupling device may enable a mechanical power flow to drive a second connecting shaft, which is rotating at a second rotational speed. For instance, under the first speed-dependent driving condition, the first connecting shaft may connect an inner race of the first coupling device, e.g., the freewheel clutch, and the second connecting shaft may connect an outer race of the first coupling device.

Furthermore, the second connecting shaft preferably drives a second coupling device, which may comprise a freewheel or clutch as part of the power transmission device. The power transmission device preferably comprises a third connecting shaft and transfers the power from or to the third connecting shaft at an associated gear ratio. By way of example, the third connecting shaft is driven by the electrical propulsion to rotate at a third rotational speed. The electrical propulsion is e.g., part of an electric motor, which is, by way of example, powered by an electrical energy storge unit. More specifically, the electrical propulsion is preferably acting at an associated gear ratio on the second coupling device. The second connecting shaft may connect at the input of an inner race of the second coupling device, e.g., freewheel clutch, and a pinion may be connected to an outer race of the second coupling device.

Preferably, a drive shaft is arranged at the output of the inner race of the second coupling device. The drive shaft and the second connecting shaft may be manufactured as one single piece, which may be flanged to the inner race of the second coupling device. Furthermore, at the second coupling device a mechanical power flow from the third connecting shaft can be consolidated to drive the inner race, which in turn may drive the second connecting shaft and the drive shaft. The drive shaft, which is rotating at an output rotational speed, preferably drives a mechanical load.

The overall arrangement enables speed-dependent power coupling of the electrical propulsion in order to engage with the power flow from the mechanical propulsion. Accordingly, a control system, which enables speed-dependent power coupling, can be established using the control logic that samples the relevant control loop input parameters which comprise the first and third rotational speeds of respective connecting shafts and the output rotational speed of the drive shaft. Furthermore, the input parameters may also comprise a torque value at the second connecting shaft and a torque value at the pinion. Based on the information from the input parameters, the control logic preferably provides a setpoint command to the electrical propulsion and controls the speed and torque thereof so as to establish different operational cases. Each operational case may be defined to enable different power allocations between the mechanical propulsion and the electrical propulsion to achieve specific energy management objectives.

The rotational speed of the mechanical propulsion preferably changes dynamically throughout a given flight mission, for example, respective helicopter flight segment transitions from cruise to hover, manoeuvring, gusts, and other dynamic load scenarios, where wear and tear is particularly severe. Therefore, depending on the flight scenario, it might be beneficial to operate the mechanical propulsion at a working point of an optimized speed and torque for reduced wear and tear.

In addition, the electronical propulsion provided in the hybrid electrical propulsion system may reduce the high costs for operation and maintenance that are linked to the operation of the mechanical propulsion, such as thermal engines and gas turbines.

Moreover, the hybrid electrical propulsion system preferably enables the mechanical propulsion to be operated at a working point of an optimized speed and torque for reduced fuel consumption. For instance, in one operating scenario, mechanical propulsion may be partially unloaded with the torque contribution from the electrical propulsion, or the electrical propulsion may completely unload the mechanical propulsion and drive the mechanical load alone.

Furthermore, in another operating scenario, if there is sufficient power reserve at the mechanical propulsion, e.g., overpower during cruise flight, the mechanical propulsion may drive the mechanical load and at the same time the resistive torque of electrical propulsion which is operated as a generator. As such, energy regeneration may optimize the available energy of the electrical energy storage unit in preparation for upcoming discharge operating conditions, which may be beneficial to the overall size diminution and potential downsizing of the electrical energy storage unit, thereby reducing in weight.

According to some aspects, the second connecting shaft and the drive shaft are integrally formed as a one-piece shaft.

According to some aspects, the first speed-dependent driving condition is fulfilled if the drive shaft rotates with an output rotational speed that is smaller than or equal to an input rotational speed of the first connecting shaft.

According to some aspects, the second coupling device is connected via an inner gear having an associated gear ratio to the third connecting shaft.

Preferably, the second speed-dependent driving condition is fulfilled if the drive shaft rotates with an output rotational speed that is smaller than or equal to a product of the associated gear ratio multiplied with a rotational speed of the third connecting shaft.

According to some aspects, the inner gear is connected to the second coupling device via a pinion.

Preferably, the control system comprises at least a first torque sensor for sensing torque at the second connecting shaft and a second torque sensor for sensing torque at the pinion.

Preferably, the control system is configured to control torque of the at least one electrical machine based on the sensed torque of the second connecting shaft and the sensed torque of the pinion.

According to some aspects, the control system comprises a plurality of rotational speed sensors for sensing at least the input rotational speed of the first connecting shaft, the rotational speed of the third connecting shaft, and the output rotational speed of the drive shaft.

According to some aspects, the first coupling device comprises a freewheel or a clutch.

According to some aspects, the second coupling device comprises a freewheel or a clutch.

According to some aspects, the second coupling device is configured to couple the second connecting shaft with the third connecting shaft in a driving manner if the control logic provides the setpoint command to the at least one electrical machine for operating the at least one electrical machine in the generator mode.

According to some aspects, the second coupling device is configured to enable bi-directional torque transmission.

According to some aspects, the second coupling device comprises a mechanically controlled torque limiting device.

Preferably, the mechanically controlled torque limiting device is a torque limiter or an overload clutch.

According to some aspects, the second coupling device comprises an actively controlled clutch.

Preferably, the control logic is configured to control the actively controlled clutch by means of a suitable clutch command signal.

According to some aspects, the at least one electrical machine is connected to an electrical energy storage unit that is configured to supply electrical energy to the at least one electrical machine in the motor mode.

According to some aspects, the at least one electrical machine is connected to the electrical energy storage unit to supply electrical energy to the electrical energy storage unit in the generator mode.

The present disclosure further provides an aircraft comprising any of the above hybrid electrical propulsion systems.

BRIEF DESCRIPTION OF THE DRAWINGS

Embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
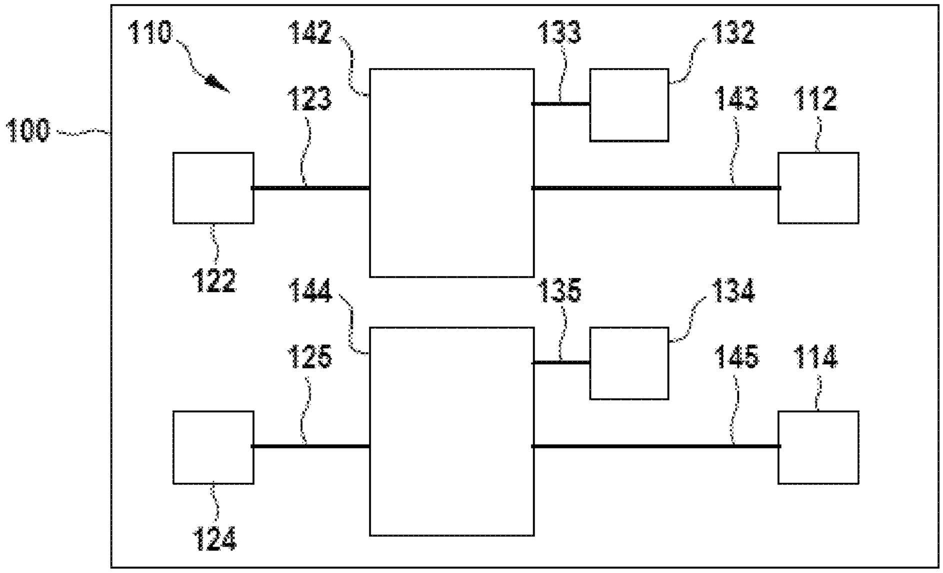
FIG. 1 is a schematic diagram of an illustrative hybrid electrical propulsion system of an aircraft according to one embodiment of the present disclosure.

FIG. 1 shows an aircraft 100 that may be embodied as a rotary-wing aircraft or a fixed-wing aircraft. It should be noted that a rotary-wing aircraft may be any aircraft having rotors. Exemplary embodiments of a rotary-wing aircraft may include airplanes, vertical take-off and landing (VTOL) aircrafts, multicopters, helicopters, drones, etc.

Illustratively, the aircraft 100 is powered by a hybrid electrical propulsion system 110 and comprises a predetermined number of thrust producing units, e.g., two propellers 112, 114. By way of example, the hybrid electrical propulsion system 110 of the aircraft 100 comprises e.g., two power transmission devices 142, 144 to drive the two propellers 112, 114, respectively. The two propellers 112, 114 are acting as mechanical loads of the hybrid electrical propulsion system 110. Each power transmission device 142, 144 is mechanically driven by a respective thermal engine 122, 124. Depending on the operational cases of the aircraft 100, each thermal engine 122, 124 may engage with a respective electrical machine 132, 134 through the respective power transmission device 142, 144 to achieve individual optimization goals. Each electrical machine 132, 134 may operate as an electric motor or an electric generator under different operational cases of the aircraft 100.

As shown in FIG. 1, one thermal engine 122 is illustratively connected to one power transmission device 142 with a first thermal engine connecting shaft 123. The power transmission device 142 is also connected to one electrical machine 132 via an electrical machine connecting shaft 133 so that the power transmission device 142 may be driven by the thermal engine 122 and/or the electrical machine 132. The propeller 112 is illustratively connected to the power transmission device 142 via a drive shaft 143 to be driven by the thermal engine 122 and/or the electrical machine 132.

Similarly, another thermal engine 124 is illustratively connected to another power transmission device 144 with another thermal engine connecting shaft 125. The power transmission device 144 is also connected to another electrical machine 134 via another electrical machine connecting shaft 135 so that the power transmission device 144 may be driven by the thermal engine 124 and/or the electrical machine 134. The propeller 114 is illustratively connected to the power transmission device 144 via another drive shaft 145 to be driven by the thermal engine 124 and/or the electrical machine 134.

Figure 2:
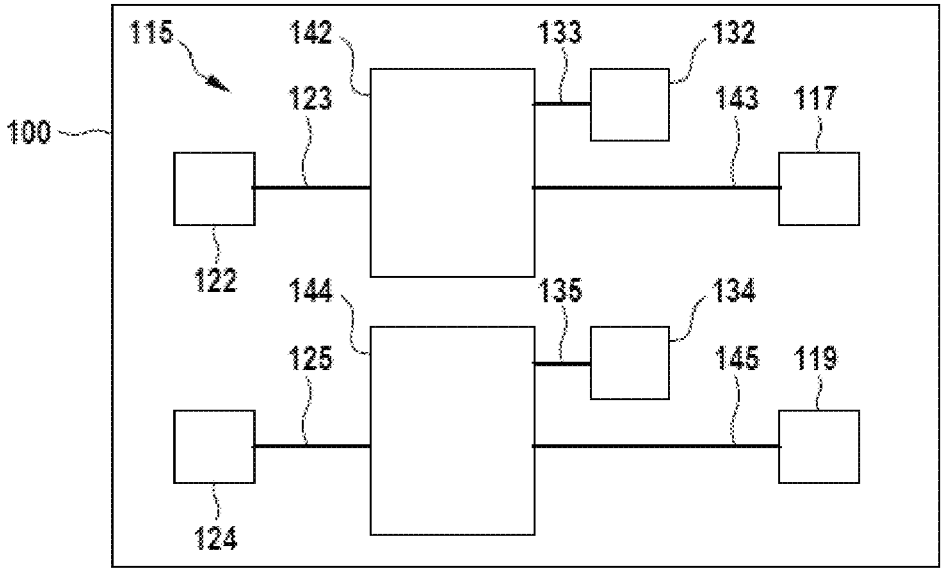
FIG. 2 is a schematic diagram of an illustrative hybrid electrical propulsion system of an aircraft according to another embodiment of the present disclosure.

FIG. 2 shows the aircraft 100 of FIG. 1 having a hybrid electrical propulsion system 115 that comprises the two power transmission devices 142, 144 which are respectively connected to the two thermal engines 122, 124 via the two thermal engine connecting shafts 123, 125, and the two electrical machines 132, 134 via the two electrical machine connecting shafts 133, 135.

However, in contrast to FIG. 1, the hybrid electrical propulsion system 115 comprises two main gearboxes 117, 119 as mechanical loads. More specifically, the main gearbox 117 is connected to the power transmission device 142 via the drive shaft 143 for powering the input of the main gearbox 117, whereas the main gear box 119 is connected to the power transmission device 144 via the drive shaft 145 for powering the input of the main gearbox 119.

Both FIG. 1 and FIG. 2 show the illustrative aircraft 100 with a hybrid electrical propulsion system, i.e., the hybrid electrical propulsion system 110, 115, which comprises two power transmission paths. However, it should be noted that the number of the power transmission paths as well as the mechanical loads may also just be one or even more than two. Furthermore, for each power transmission path, more than one thermal engine and various power transmission arrangements may be provided, as described in more detail below at FIG. 3 and FIG. 4.

Figure 3:
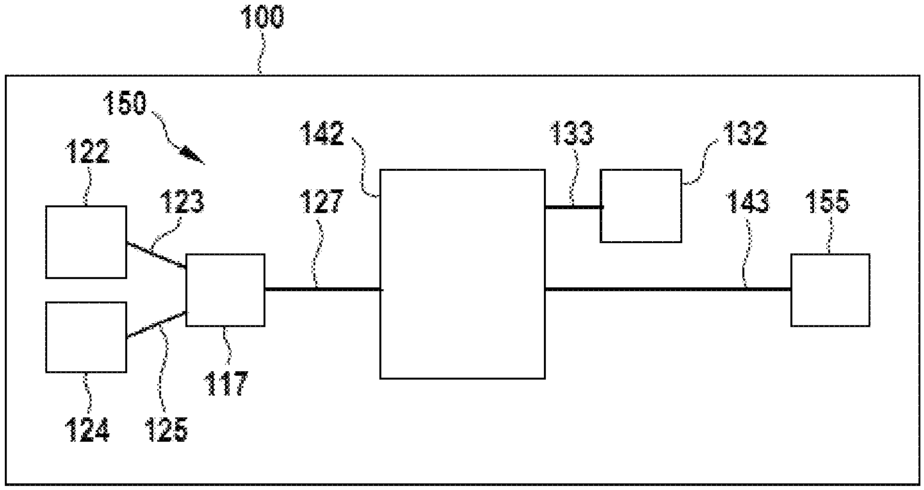
FIG. 3 is a schematic diagram of an illustrative hybrid electrical tail rotor drive system of an aircraft in accordance with some embodiments.

FIG. 3 shows an illustrative power transmission path of a hybrid electrical tail rotor drive system 150 of the aircraft 100 of FIG. 1. The hybrid electrical tail rotor drive system 150 illustratively comprises the power transmission device 142, the two thermal engines 122, 124, the electrical machine 132, the main gearbox 117, and a tail rotor 155 as the mechanical load.

Illustratively, the main gearbox 117 is driven by the two thermal engines 122, 124 via the two thermal engine connecting shafts 123, 125. The main gearbox 117 consolidates inputs from both thermal engines 122, 124 to one mechanical output at the main gearbox connecting shaft 127 to drive the power transmission device 142. The electrical machine 132 is connected to the power transmission device 142 via the electrical machine connecting shaft 133 to selectively drive the power transmission device 142. The power transmission device 142, thus, drives the drive shaft 143 which is the input to the tail rotor 155.

Similar to FIG. 1 and FIG. 2, depending on the operational cases of the aircraft 100, the thermal engine 122 and/or the thermal engine 124 may engage with the electrical machine 132 through the power transmission device 142 to achieve individual optimization goals for powering the tail rotor 155. It should be noted that the power transmission path described at FIG. 3 is likewise appliable to drive other mechanical loads such as the propellers 112, 114 of FIG. 1 or a main rotor of the aircraft 100, as described below at FIG. 4.

Figure 4:
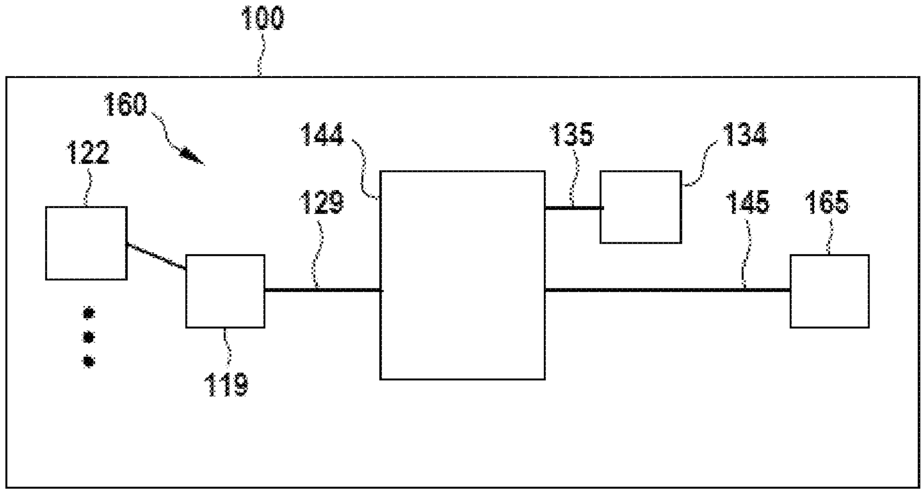
FIG. 4 is a schematic diagram of an illustrative hybrid electrical main rotor drive system of an aircraft in accordance with some embodiments.

FIG. 4 shows an illustrative power transmission path of a hybrid electrical main rotor drive system 160 of the aircraft 100 of FIG. 2. The hybrid electrical main rotor drive system 160 illustratively comprises the power transmission device 144, the at least one thermal engine 122, the electrical machine 134, the main gearbox 119, and a main rotor 165 as the mechanical load.

Illustratively, the main gearbox 119 is driven by the at least one thermal engine 122 via the at least one thermal engine connecting shaft 123. The illustratively vertical arranged dots in FIG. 4 represent additional thermal engines and their associated thermal engine connecting shafts which may likewise be connected to the main gearbox 119.

By way of example, the main gearbox 119 may consolidate inputs from the at least one thermal engine 124 and any additional thermal engines to one mechanical output at the main gearbox connecting shaft 129 to drive the power transmission device 144. The electrical machine 134 is connected to the power transmission device 144 via the electrical machine connecting shaft 135 to selectively drive the power transmission device 144. The power transmission device 144, thus, drives the drive shaft 145 which is the input to the main rotor 165. Depending on the operational cases of the aircraft 100, the at least one thermal engine 122 may engage with the electrical machine 134 through the power transmission device 144 to achieve individual optimization goals for powering the main rotor 165.

At this point, it should be noted that FIG. 1 to FIG. 4 each describes an illustrative realization of a hybrid electrical propulsion system for an aeronautical application according to the present disclosure. Such a hybrid electrical propulsion system combines at least one mechanical propulsion that drives a power transmission device on an input stage with a complementary electrical propulsion that drives a further input stage. Each transmission arrangement according to the present disclosure may be operated in four different operating scenarios through a control logic, as described in more detail below at FIG. 5 to FIG. 10.

Figure 5:
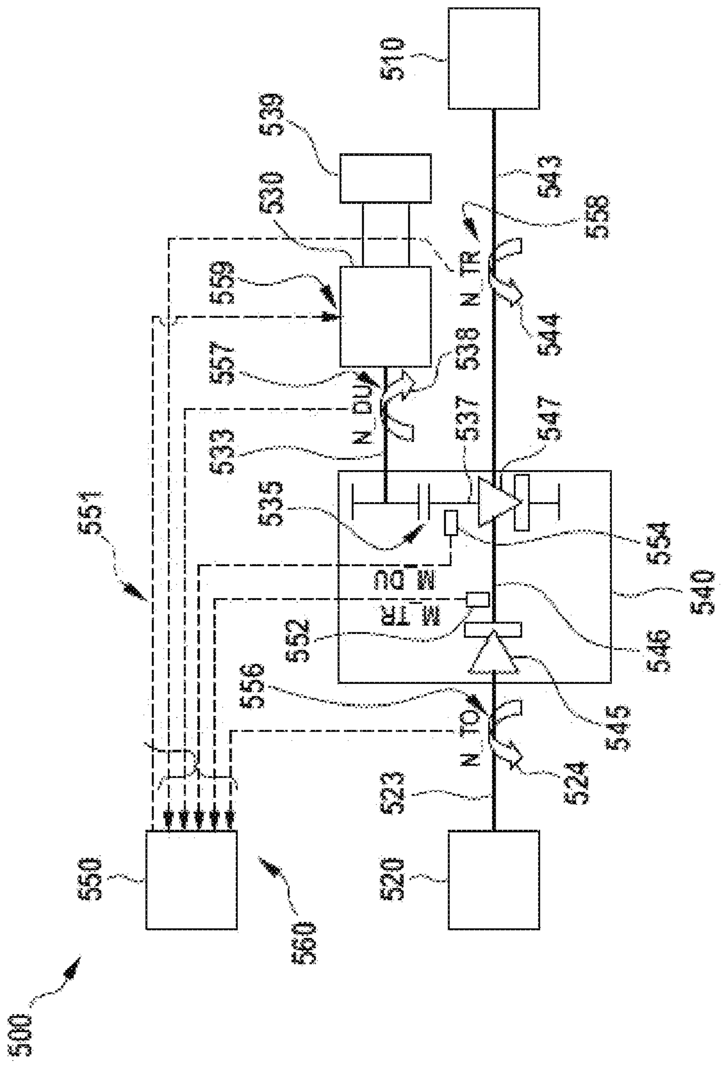
FIG. 5 is a schematic diagram of an illustrative hybrid electrical propulsion system that is controlled by a control logic in accordance with some embodiments.

FIG. 5 shows a hybrid electrical propulsion system 500 for an aeronautical application according to a preferred embodiment of the present disclosure. However, only a single power transmission path is described representative one or more power transmission paths which may be applicable in a given hybrid electrical propulsion system.

Illustratively, the hybrid electrical propulsion system 500 comprises at least one mechanical load 510, at least one thermal engine 520, at least one electrical machine 530 that is operable in motor mode or generator mode, a power transmission device 540, and a control system 560. The at least one electrical machine 530 is illustratively connected to an electrical energy storage unit 539 which may be configured to supply electrical energy to the at least one electrical machine 530 in the motor mode.

According to the present disclosure, the power transmission device 540 comprises a first coupling device 545 and a second coupling device 547. Preferably, the first coupling device 545 comprises a freewheel or a clutch. The first coupling device 545 is connected via a first connecting shaft 523 to the at least one thermal engine 520. The first connecting shaft 523 may act as thermal engine connecting shaft that rotates with a rotational speed N_TO, e.g., in a thermal engine connecting shaft rotation direction 524. Furthermore, the first coupling device 545 is connected via a second connecting shaft 546 to the second coupling device 547. The first coupling device 545 is configured to couple the first connecting shaft 523 with the second connecting shaft 546 in a driving manner if a first speed-dependent driving condition is fulfilled.

The second coupling device 547 is illustratively connected via a third connecting shaft 533 to the at least one electrical machine 530. The third connecting shaft 533 may act as an electrical machine connecting shaft that rotates with a rotational speed N_DU, e.g., in an electrical machine connecting shaft rotation direction 538. Illustratively, the second coupling device 547 may be connected via an inner gear 535 having an associated gear ratio to the third connecting shaft 533. More specifically, the inner gear 535 is preferably connected to the second coupling device 547 via a pinion 537.

Furthermore, the second coupling device 547 is connected via a drive shaft 543 to the at least one mechanical load 510. The second connecting shaft 546 is coupled with the drive shaft 543 in a driving manner. Illustratively, the second connecting shaft 546 may act as part of the drive shaft 543 that rotates with a rotational speed N_TR, e.g., in a drive shaft rotation direction 544. By way of example, the second connecting shaft 546 and the drive shaft 543 are integrally formed as a one-piece shaft.

Preferably, the second coupling device 547 is configured to enable bi-directional torque transmission. Preferentially, the second coupling device 547 comprises a freewheel or a clutch. The second coupling device 547 is configured to couple the third connecting shaft 533 with the drive shaft 543 in a driving manner if a control logic 550 provides a setpoint command 559 to the at least one electrical machine 530 for operating the at least one electrical machine 530 in the motor mode and if a second speed-dependent driving condition is fulfilled. Furthermore, the second coupling device 547 may be configured to couple the second connecting shaft 546 with the third connecting shaft 533 in a driving manner if the control logic 550 provides the setpoint command 559 to the at least one electrical machine 530 for operating the at least one electrical machine 530 in the generator mode. Preferably, the setpoint command 559 may be switched by the control system 560 during operation of the hybrid electrical propulsion system 500 in order to enable different operating scenarios of the hybrid electrical propulsion system 500, as described below at FIG. 6 to FIG. 10.

By way of example, the control system 560 comprises the control logic 550 that is configured to provide the setpoint command 559 to the at least one electrical machine 530.

Illustratively, the control system 560 comprises at least a first torque sensor 552 for sensing torque at the second connecting shaft 546 and a second torque sensor 554 for sensing torque at the pinion 537. Preferably, the control system 560 is configured to control torque of the at least one electrical machine 530 based on the sensed torque of the second connecting shaft 546 and the sensed torque of the pinion 537.

Preferably, the control system 560 comprises a plurality of rotational speed sensors 556, 557, 558 for sensing at least the input rotational speed N_TO of the first connecting shaft 523, the rotational speed N_DU of the third connecting shaft 533, and the output rotational speed N_TR of the drive shaft 543.

By way of example, the data collected from the plurality of rotational speed sensors 556, 557, 558 and the torque sensors 552, 554 may be transferred via data lines 551 to the control system 560 to be used as input parameters to be sampled by the control logic 550. Such data may then e.g., be used to determine whether the first and second speed-dependent driving conditions are fulfilled. For instance, the first and second speed-dependent driving conditions are both fulfilled in a first operating scenario which is described in more detail at FIG. 6.

Figure 6:
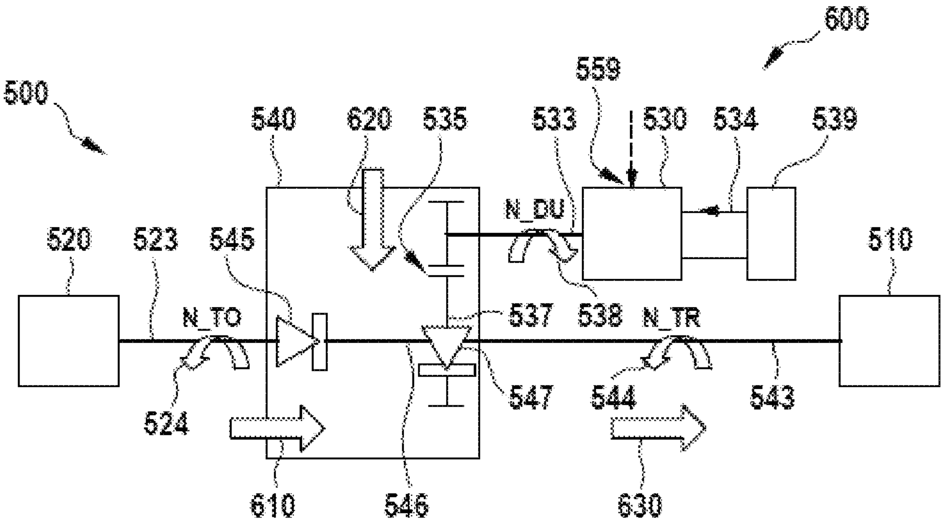
FIG. 6 is a schematic diagram of the hybrid electrical propulsion system of FIG. 5 operating in a first operating scenario.

FIG. 6 shows the hybrid electrical propulsion system 500 of FIG. 5 operating in a first operating scenario 600 that consists in a thermal power propulsion mode with electrical power support. The thermal engine 520 drives the first connecting shaft 523 to rotate in the thermal engine connecting shaft rotation direction 524 with the input rotational speed N_TO. The mechanical load 510 is driven by the drive shaft 543 which rotates with the output rotational speed N_TR in the drive shaft rotation direction 544.

In the first operating scenario 600, the first speed-dependent driving condition is fulfilled if the output rotational speed N_TR is smaller than or equal to the input rotational speed N_TO, i.e., if N_TR<=N_TO. In other words, the first speed-dependent driving condition is fulfilled if, without further propulsion driving the power transmission device 540, the rotational speed N_TR of the drive shaft 543 is smaller than or equal to the rotational speed N_TO of the first connecting shaft 523. However, it should be noted that the first speed-dependent driving condition may also be fulfilled if further propulsion is applied e.g., by the electrical machine 530 and if the drive shaft 543 still rotates with the output rotational speed N_TR that is smaller than or equal to the input rotational speed N_TO of the first connecting shaft 523. When the first speed-dependent driving condition is fulfilled, the first coupling device 545 is clutched to couple the first connecting shaft 523 with the second connecting shaft 546 in a driving manner. A thermal power flow 610 from the first connecting shaft 523 to the second connecting shaft 546 is, thus, established and may be further transmitted in a driving manner to the drive shaft 543 that is coupled with the second connecting shaft 546.

Furthermore, the third connecting shaft 533 that rotates at the rotational speed N_DU is connected to the electrical machine 530. The second speed-dependent driving condition is fulfilled if the output rotational speed N_TR is smaller than or equal to a product of the associated gear ratio of the inner gear 535 multiplied with the rotational speed N_DU of the third connecting shaft 533, i.e., if N_TR<=N_DU*gear ratio.

More specifically, the second coupling device 547 couples the third connecting shaft 533 with the drive shaft 543 in a driving manner if the control logic 550 provides the setpoint command 559 to the at least one electrical machine 530 for operating the at least one electrical machine 530 in the motor mode and if the above defined second speed-dependent driving condition is fulfilled.

As shown in FIG. 6, the setpoint command 559 is provided by the control logic 550 of FIG. 5 to the electrical machine 530 for operating the at least one electrical machine 530 in the motor mode. More specifically, the at least one electrical machine 530 is connected to an electrical energy storage unit 539 that is configured to supply electrical energy to the at least one electrical machine 530 in the motor mode. Illustratively, the electrical power supply 534 for motor mode is established from the electrical energy storage unit 539 to the electrical machine 530.

As the second coupling device 547 is clutched and couples the third connecting shaft 533 with the drive shaft 543 in a driving manner in FIG. 6, an electrical power flow 620 from the electrical machine 530 which is supplied by the electrical energy storage unit 539 is established. A combined thermal/electrical drive power flow 630 formed by the thermal power flow 610 and the electrical power flow 620 is then transmitted to the drive shaft 543, thus, leading to a torque sharing.

The torque sharing may then be controlled by the control logic 550 by providing a suitable setpoint command 559, which may divide the load torque between the thermal power flow 610 and the electrical power flow 620. With this operating scenario 600 the thermal engine 520 may be supported and, thus, partially unloaded, by means of the torque contribution from the electrical machine 530.

Depending on an underlying flight scenario of an aircraft which uses the hybrid electrical propulsion system 500, e.g., the aircraft 100 of FIG. 1 or FIG. 2, the thermal engine 520 may operate at a constant working point, e.g., with optimized speed and torque for reduced fuel consumption, optimized for reduced wear and tear, etc., whereas the electrical machine 530 may complement the remaining mechanical load demands, e.g., dynamic or transient load demands at the mechanical load 510. However, it should be noted that, in another flight scenario, the thermal engine 520 may also be fully unloaded to achieve a fully electrical propulsion, as described hereinafter at FIG. 7.

Figure 7:
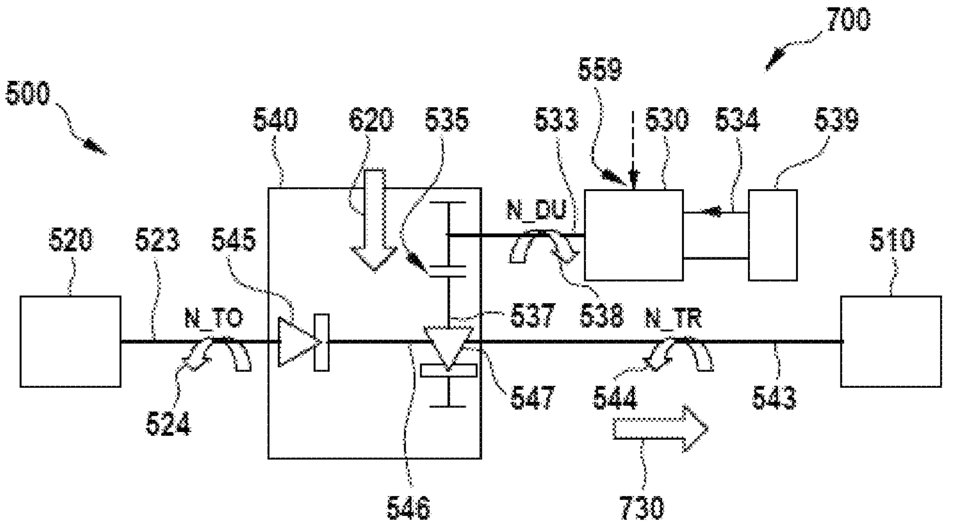
FIG. 7 is a schematic diagram of the hybrid electrical propulsion system of FIG. 5 operating in a second operating scenario.

FIG. 7 shows the hybrid electrical propulsion system 500 of FIG. 5 operating in a second operating scenario 700 that consists in an electrical power propulsion mode. In the second operating scenario 700, the second speed-dependent driving condition is fulfilled similar to the first operating scenario 600 of FIG. 6, i.e., N_TR<=N_DU*gear ratio, and the setpoint command 559 is provided by the control logic 550 of FIG. 5 to the electrical machine 530 for operating the at least one electrical machine 530 in the motor mode. Accordingly, the second coupling device 547 is clutched and couples the third connecting shaft 533 with the drive shaft 543 in a driving manner and the electrical power flow 620 of FIG. 6 from the electrical machine 530 which is supplied by the electrical energy storage unit 539 is established.

However, in contrast to the first operating scenario 600 of FIG. 6, the electrical power flow 620 established under the setpoint command 559 in the electrical power propulsion mode may now drive the drive shaft 543 in the second operating scenario 700 at an output rotational speed that is greater than an input rotational speed of the first connecting shaft 523. In other words, the rotational speed N_TR of the drive shaft 543 is greater than the rotational speed N_TO of the first connecting shaft 523, i.e., N_TR>N_TO. Therefore, the first speed-dependent driving condition is not fulfilled and the first coupling device 545 is not clutched.

Illustratively, the thermal engine 520 may still drive the first connecting shaft 523 to rotate at the input rotational speed N_TO of the first connecting shaft 523. However, the first connecting shaft 523 is now freewheeling and, therefore, the thermal engine 520 is not contributing to propulsive torque and its power flow is zero. Thus, the mechanical load 510 is exclusively driven by an electrical drive power flow 730 formed by the electrical power flow 620 of FIG. 6 from the electrical machine 530 supplied by the electrical energy storage unit 539.

In this second operating scenario 700, the thermal engine 520 is completely unloaded, by help of the torque contribution from the electrical machine 530. Depending on an underlying flight scenario of an aircraft which uses the hybrid electrical propulsion system 500, e.g., the aircraft 100 of FIG. 1 or FIG. 2, the hybrid electrical propulsion system 500 operating fully on the electrical machine 530 in the electrical power propulsion mode 700 might be beneficial to achieve different optimization goals for the thermal engine 520, e.g., optimized speed and torque for reduced fuel consumption, optimized for reduced wear and tear, or in case that the thermal engine 520 is in a degraded mode, e.g., partial loss or full loss of mechanical propulsion capability. However, in other operating scenarios, the hybrid electrical propulsion system 500 may alternatively be operated fully on the thermal engine 520, as described hereinafter at FIG. 8.

Figure 8:
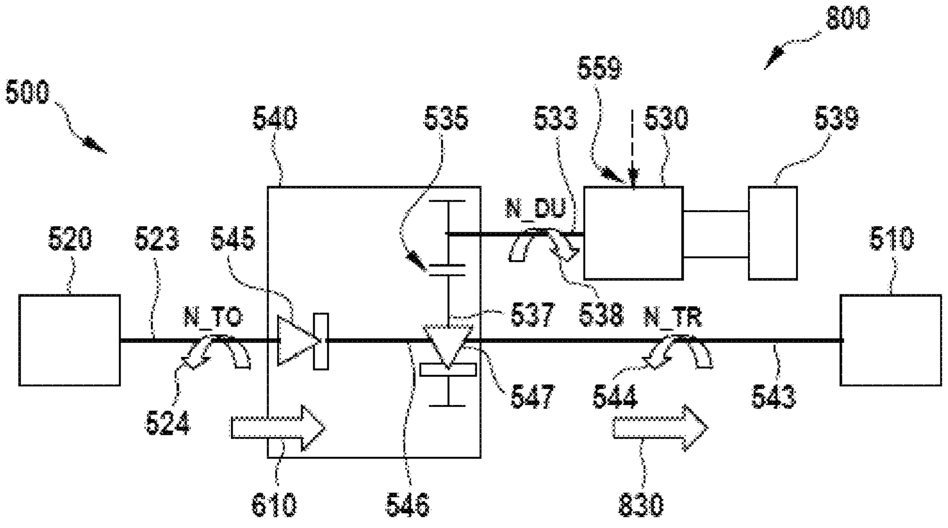
FIG. 8 is a schematic diagram of the hybrid electrical propulsion system of FIG. 5 operating in a third operating scenario.

FIG. 8 shows the hybrid electrical propulsion system 500 of FIG. 5 operating in a third operating scenario 800 that consists in a thermal power propulsion mode. Similar to the first operating scenario 600 of FIG. 6, but in contrast to the second operating scenario 700 of FIG. 7, the first speed-dependent driving condition is fulfilled, i.e., N_TR<=N_TO, so that the first coupling device 545 is clutched to couple the first connecting shaft 523 with the second connecting shaft 546 in a driving manner. The thermal power flow 610 of FIG. 6 from the first connecting shaft 523 to the second connecting shaft 546 is then established and is further transmitted in a driving manner to the drive shaft 543 that is coupled with the second connecting shaft 546.

However, in contrast to the first operating scenario 600 of FIG. 6 and also the second operating scenario 700 of FIG. 7, the second speed-dependent driving condition is not fulfilled as the product of the associated gear ratio multiplied with the rotational speed N_DU of the third connecting shaft 533 is now smaller than the output rotational speed N_TR of the drive shaft 543. In other words, N_TR>N_DU*gear ratio. Therefore, the second coupling device 547 is not clutched and the pinion 537 is freewheeling.

Accordingly, the thermal engine 520 is exclusively contributing to the power flow towards the mechanical load 510 in the third operating scenario 800, i.e., a thermal drive power flow 830 formed by the thermal power flow 610 to drive the mechanical load 510, while the propulsive torque contribution and the power flow from the electrical machine 530 is zero. Depending on an underlying flight scenario of an aircraft which uses the hybrid electrical propulsion system 500, e.g., the aircraft 100 of FIG. 1 or FIG. 2, the hybrid electrical propulsion system 500 operating fully on the thermal engine 520 in the thermal power propulsion mode 800 might be beneficial if the electrical machine 530 is e.g., in a degraded mode, such as a partial loss or full loss of mechanical propulsion capability.

At this point, it should be noted that the hybrid electrical propulsion system 500 may also operate fully on the thermal engine 520 in a thermal power propulsion mode during which an electrical power regeneration can be achieved, as described hereinafter at FIG. 9 and FIG. 10.

Figure 9:
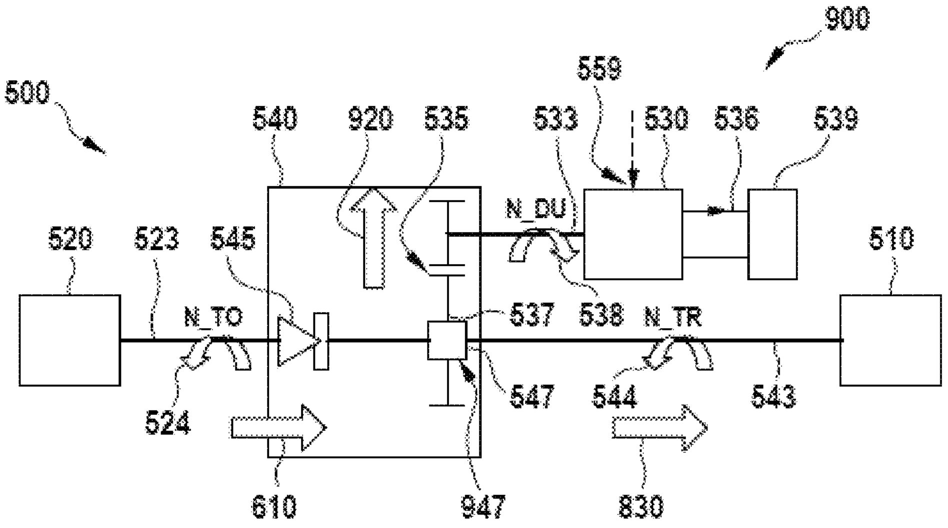
FIG. 9 is a schematic diagram of the hybrid electrical propulsion system of FIG. 5 operating in a fourth operating scenario.

FIG. 9 shows the hybrid electrical propulsion system 500 of FIG. 5 operating in a fourth operating scenario 900 that consists in a thermal power propulsion mode with electrical power regeneration. Similar to the third operating scenario 800 of FIG. 8, the first speed-dependent driving condition is fulfilled, i.e., N_TR<=N_TO, so that the first coupling device 545 is clutched to couple the first connecting shaft 523 with the second connecting shaft 546 in a driving manner. The thermal power flow 610 of FIG. 8 from the first connecting shaft 523 to the second connecting shaft 546 is then established and is further transmitted in a driving manner to the drive shaft 543 that is coupled with the second connecting shaft 546.

However, according to the fourth operating scenario 900 the second coupling device 547 now couples the second connecting shaft 546 with the third connecting shaft 533 in a driving manner if the control logic 550 provides the setpoint command 559 to the at least one electrical machine 530 for operating the at least one electrical machine 530 in the generator mode. By way of example, the electrical machine 530 is controlled by the control logic 550 under the setpoint command 559 to allow the third connecting shaft 533 to rotate at the rotational speed N_DU. More specifically, the product of the associated gear ratio multiplied with the rotational speed N_DU of the third connecting shaft 533 follows the output rotational speed N_TR of the drive shaft 543.

The torque transmission from the second connecting shaft 546 to the third connecting shaft 533 via the second coupling device 547 allows a regenerative electrical power flow 920 to be generated from the thermal power flow 610 and transmitted from the second coupling device 547 through the third connecting shaft 533 to the electrical machine 530 to generate electrical energy in the generator mode. An electrical power supply 536 from the electrical machine 530 in the generator mode may be transmitted and stored in the electrical energy storage unit 539. Illustratively, the at least one electrical machine 530 is connected to the electrical energy storage unit 539 to supply electrical energy to the electrical energy storage unit 539 in the generator mode.

Illustratively, the second coupling device 547 now comprises a mechanically controlled torque limiting device 947, in particular a torque limiter or an overload clutch, with an associated resistive torque threshold. Thus, the second coupling device 547 may automatically decouple when the transmitted torque exceeds the predetermined resistive torque threshold of the mechanically controlled torque limiting device 947. Accordingly, the second coupling device 547 may protect the drive shaft 543 from overload failure scenarios e.g., during electrical energy generation mode, mechanical shaft blockage, etc. However, instead of using a mechanically controlled torque limiting device 947, the second coupling device 547 may alternatively be actively controlled by the control system 560 of FIG. 5, as described in more detail hereinafter at FIG. 10.

Figure 10:
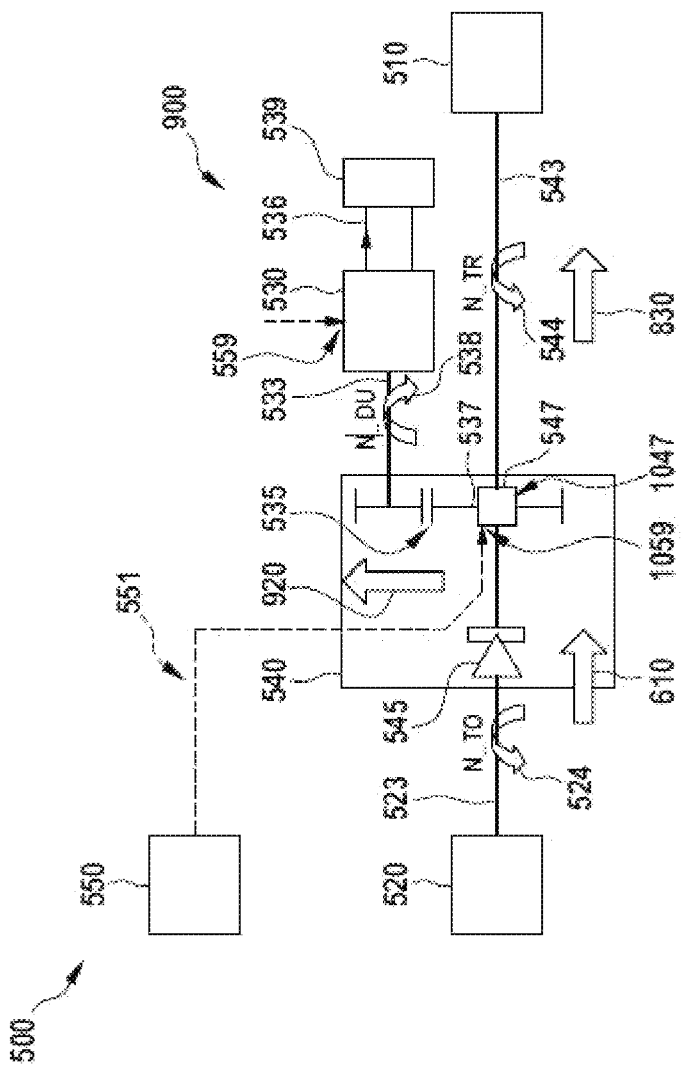
FIG. 10 is a schematic diagram of the hybrid electrical propulsion system of FIG. 5 according to a variant and operating in the fourth operating scenario according to FIG. 9.

FIG. 10 shows the hybrid electrical propulsion system 500 of FIG. 5 operating in the fourth operating scenario 900 of FIG. 9 that consists in the thermal power propulsion mode with electrical power regeneration. As described above at FIG. 9, the first speed-dependent driving condition is fulfilled in the fourth operating scenario 900, i.e., N_TR<=N_TO, so that the first coupling device 545 is clutched to couple the first connecting shaft 523 with the second connecting shaft 546 in a driving manner. The thermal power flow 610 of FIG. 9 from the first connecting shaft 523 to the second connecting shaft 546 is then established and is further transmitted in a driving manner to the drive shaft 543 that is coupled with the second connecting shaft 546.

However, in contrast to FIG. 9, the second coupling device 547 now illustratively comprises an actively controlled clutch 1047. Preferably, the control logic 550 is configured to control the actively controlled clutch 1047 by means of a suitable clutch command signal 1059. More specifically, the second coupling device 547 may be controlled to couple the second connecting shaft 546 with the third connecting shaft 533 according to the suitable clutch command signal 1059. The suitable clutch command signal 1059 is sent from the control logic 550 to the second coupling device 547 via one of the data lines 551 of FIG. 5.

By configuring the second coupling device 547 to enable bi-directional torque transmission, the hybrid electrical propulsion system 500 operating according to the fourth operating scenario 900 in the thermal power propulsion mode with electrical power regeneration as described in FIG. 9 and FIG. 10 enables both the mechanical load 510 and the load torque caused by the electrical machine 530 in the generator mode be driven by the thermal engine 520. Depending on an underlying flight scenario of an aircraft which uses the hybrid electrical propulsion system 500, e.g., the aircraft 100 of FIG. 1 or FIG. 2, the hybrid electrical propulsion system 500 with the electrical machine 530 in the generator mode enables optimization of stored energy in the electrical energy storage unit 539 in the fourth operating scenario 900, thus, preparing upcoming discharging operational scenarios, e.g., the first to third operating scenarios 600, 700, 800 of FIG. 6, FIG. 7, and FIG. 8.

It should be noted that the above described embodiments are merely described to illustrate possible embodiments of the present disclosure, but not in order to restrict the present disclosure thereto. Instead, multiple modifications and variations of the above described embodiments are possible and should, therefore, also be considered as being part of the disclosure.

For instance, according to FIG. 5 to FIG. 10 the thermal engine 510 is connected to the power transmission device 540 via one first connecting shaft 523. However, if desired, additional gearboxes and connecting shafts may be applied to connect the thermal engine 510 and the power transmission device 540 in a driving manner, as e.g., described at FIG. 3. Furthermore, the number of mechanical loads connected to the power transmission device 540 may be greater than one. Likewise, there might also be more than one electrical machine and/or more than one thermal engine connected to the power transmission device 540, and so on.

REFERENCE LIST

100 aircraft
110, 115 hybrid electrical propulsion systems
112, 114 propellers
117, 119 main gearboxes
122, 124 thermal engines
123, 125 thermal engine connecting shafts
127, 129 main gearbox connecting shafts
132, 134 electric motors/generators
133, 135 electrical machine connecting shafts
142, 144 power transmission devices
143, 145 drive shafts
150 hybrid electrical tail rotor drive system
155 tail rotor
160 hybrid electrical main rotor drive system
165 main rotor
500 hybrid electrical propulsion system
510 mechanical load
520 thermal engine
523 thermal engine connecting shaft
524 thermal engine connecting shaft rotation direction
530 electric motor/generator
533 electrical machine connecting shaft
534 electrical power supply for motor mode
535 inner gear
536 electrical power supply through generator mode
537 pinion
538 electric motor/generator connecting shaft rotation direction
539 electrical energy storage unit
540 power transmission device
543 drive shaft
544 drive shaft rotation direction
545, 547 coupling devices
546 connecting shaft
550 control logic

551 data lines
552, 554 torque sensors
556, 557, 558 rotational speed sensors
559 setpoint command
560 control system
600 thermal power propulsion mode with electrical power support
610 thermal power flow
620 electrical power flow
630 combined thermal/electrical drive power flow
700 electrical power propulsion mode
730 electrical drive power flow
800 thermal power propulsion mode
830 thermal drive power flow
900 thermal power propulsion mode with electrical power regeneration
920 regenerative electrical power flow
947 torque limiter
1047 actively controlled clutch
1059 clutch command signal

What is claimed is:

1. A hybrid electrical propulsion system for an aeronautical application, wherein the system comprises:

at least one mechanical load;

at least one thermal engine;

at least one electrical machine that is operable in motor mode or generator mode;

a power transmission device comprising a first coupling device and a second coupling device, wherein the first coupling device is connected via a first connecting shaft to the at least one thermal engine and via a second connecting shaft to the second coupling device, wherein the second coupling device is further connected via a third connecting shaft to the at least one electrical machine and via a drive shaft to the at least one mechanical load, and wherein the second connecting shaft is coupled with the drive shaft in a driving manner; and a control system comprising a control logic that is configured to provide a setpoint command to the at least one electrical machine;

wherein the first coupling device is configured to couple the first connecting shaft with the second connecting shaft in a driving manner if a first speed-dependent driving condition is fulfilled; and wherein the second coupling device is configured to couple the third connecting shaft with the drive shaft in a driving manner if the control logic provides the setpoint command to the at least one electrical machine for operating the at least one electrical machine in the motor mode and if a second speed-dependent driving condition is fulfilled; and wherein the second coupling device is connected via an inner gear having an associated gear ratio to the third connecting shaft, and wherein the second speed-dependent driving condition is fulfilled if the drive shaft rotates with an output rotational speed that is smaller than or equal to a product of the associated gear ratio multiplied with a rotational speed of the third connecting shaft.

2. The hybrid electrical propulsion system of claim 1, wherein the second connecting shaft and the drive shaft are integrally formed as a one-piece shaft.

3. The hybrid electrical propulsion system of claim 1, wherein the first speed-dependent driving condition is fulfilled if the drive shaft rotates with an output rotational speed that is smaller than or equal to an input rotational speed of the first connecting shaft.

4. The hybrid electrical propulsion system of claim 1, wherein the inner gear is connected to the second coupling device via a pinion, wherein the control system comprises at least a first torque sensor for sensing torque at the second connecting shaft and a second torque sensor for sensing torque at the pinion, and wherein the control system is configured to control torque of the at least one electrical machine based on the sensed torque of the second connecting shaft and the sensed torque of the pinion.

5. The hybrid electrical propulsion system of claim 1, wherein the control system comprises a plurality of rotational speed sensors for sensing at least the input rotational speed of the first connecting shaft, the rotational speed of the third connecting shaft, and the output rotational speed of the drive shaft.

6. The hybrid electrical propulsion system of claim 1, wherein the first coupling device comprises a freewheel or a clutch.

7. The hybrid electrical propulsion system of claim 1, wherein the second coupling device comprises a freewheel or a clutch.

8. The hybrid electrical propulsion system of claim 1, wherein the second coupling device is configured to couple the second connecting shaft with the third connecting shaft in a driving manner if the control logic provides the setpoint command to the at least one electrical machine for operating the at least one electrical machine in the generator mode.

9. The hybrid electrical propulsion system of claim 8, wherein the second coupling device is configured to enable bi-directional torque transmission.

10. The hybrid electrical propulsion system of claim 8, wherein the second coupling device comprises a mechanically controlled torque limiting device, in particular a torque limiter or an overload clutch.

11. The hybrid electrical propulsion system of claim 8, wherein the second coupling device comprises an actively controlled clutch, and wherein the control logic is configured to control the actively controlled clutch by means of a suitable clutch command signal.

12. The hybrid electrical propulsion system of claim 1, wherein the at least one electrical machine is connected to an electrical energy storage unit that is configured to supply electrical energy to the at least one electrical machine in the motor mode.

13. The hybrid electrical propulsion system of claim 12, wherein the at least one electrical machine is connected to the electrical energy storage unit to supply electrical energy to the electrical energy storage unit in the generator mode.

14. An aircraft comprising the hybrid electrical propulsion system of claim 1.

15. The hybrid electrical propulsion system of claim 1, wherein the second coupling device is prevented from coupling the third connecting shaft with the drive shaft unless the control logic provides the setpoint command to the electrical machine for operation in motor mode.

16. The hybrid electrical propulsion system of claim 1, wherein the second speed-dependent driving condition requires that a rotational speed of the third connecting shaft exceeds a rotational speed of the drive shaft before the second coupling device couples the third connecting shaft with the drive shaft.

17. A hybrid electrical propulsion system for an aeronautical application, wherein the system comprises:

a mechanical load;

a thermal engine;

an electrical machine operable in motor mode or generator mode;

a power transmission device comprising a first coupling device and a second coupling device, wherein the first coupling device is connected via a first connecting shaft to the thermal engine and via a second connecting shaft to the second coupling device, wherein the second coupling device is connected via a third connecting shaft to the electrical machine and via a drive shaft to the mechanical load, and wherein the second connecting shaft is drivingly coupled with the drive shaft; and a control system comprising control logic configured to provide a setpoint command to the electrical machine;

wherein the first coupling device is configured to couple the first connecting shaft with the second connecting shaft in a driving manner if a first speed-dependent driving condition is fulfilled; and wherein the second coupling device is configured to couple the third connecting shaft with the drive shaft in a driving manner if the control logic provides the setpoint command to the electrical machine for operating the electrical machine in the motor mode and if a second speed-dependent driving condition is fulfilled; and wherein the second coupling device is connected via an inner gear having an associated gear ratio to the third connecting shaft, and wherein the second speed-dependent driving condition is fulfilled if the drive shaft rotates with an output rotational speed that is smaller than or equal to a product of the associated gear ratio multiplied with a rotational speed of the third connecting shaft.

18. A hybrid electrical propulsion system for an aeronautical application, wherein the system comprises:

a mechanical load;

a thermal engine;

an electrical machine operable in motor mode or generator mode;

a power transmission device comprising a first coupling device and a second coupling device, wherein the first coupling device is connected via a first connecting shaft to the thermal engine and via a second connecting shaft to the second coupling device, wherein the second coupling device is connected via a third connecting shaft to the electrical machine and via a drive shaft to the mechanical load, and wherein the second connecting shaft is drivingly coupled with the drive shaft; and a control system comprising control logic configured to provide a setpoint command to the electrical machine;

wherein the first coupling device is configured to couple the first connecting shaft with the second connecting shaft in a driving manner if a first speed-dependent driving condition is fulfilled; and wherein the second coupling device is configured to couple the third connecting shaft with the drive shaft in a driving manner only when the control logic provides the setpoint command to the electrical machine for operating the electrical machine in the motor mode and when a second speed-dependent driving condition is fulfilled; and wherein the second coupling device is prevented from coupling the third connecting shaft with the drive shaft unless the control logic provides the setpoint command to the electrical machine for operation in motor mode.

19. A hybrid electrical propulsion system for an aeronautical application, wherein the system comprises:

a mechanical load;

a thermal engine;

an electrical machine operable in motor mode or generator mode;

a power transmission device comprising a first coupling device and a second coupling device, wherein the first coupling device is connected via a first connecting shaft to the thermal engine and via a second connecting shaft to the second coupling device, wherein the second coupling device is connected via a third connecting shaft to the electrical machine and via a drive shaft to the mechanical load, and wherein the second connecting shaft is drivingly coupled with the drive shaft; and a control system comprising control logic configured to provide a setpoint command to the electrical machine;

wherein the first coupling device is configured to couple the first connecting shaft with the second connecting shaft in a driving manner if a first speed-dependent driving condition is fulfilled; and wherein the second coupling device is configured to couple the third connecting shaft with the drive shaft in a driving manner only when the control logic provides the setpoint command to the electrical machine for operating the electrical machine in the motor mode and when a second speed-dependent driving condition is fulfilled; and wherein the second speed-dependent driving condition requires that a rotational speed of the third connecting shaft exceeds a rotational speed of the drive shaft before the second coupling device couples the third connecting shaft with the drive shaft.

* * * * *